(12) United States Patent
Moser

(10) Patent No.: US 9,868,266 B2
(45) Date of Patent: Jan. 16, 2018

(54) PREPREG MATERIALS

(71) Applicant: Hexcel Holding GMBH, Pasching (AT)

(72) Inventor: Johannes Moser, Linz (AT)

(73) Assignee: Hexcel Holding GMBH, Pasching (AT)

( * ) Notice: Subject to any disclaimer, the term of this patent is extended or adjusted under 35 U.S.C. 154(b) by 426 days.

(21) Appl. No.: 13/969,696

(22) Filed: Aug. 19, 2013

(65) Prior Publication Data

US 2014/0057096 A1   Feb. 27, 2014

(30) Foreign Application Priority Data

Aug. 27, 2012  (AT) .............. A 50344/2012

(51) Int. Cl.
| | | |
|---|---|---|
| *B32B 5/28* | (2006.01) | |
| *B32B 37/14* | (2006.01) | |
| *B32B 27/12* | (2006.01) | |
| *B32B 7/06* | (2006.01) | |
| *B32B 27/32* | (2006.01) | |
| *B29C 70/30* | (2006.01) | |

(52) U.S. Cl.
CPC ............. *B32B 5/28* (2013.01); *B29C 70/30* (2013.01); *B32B 7/06* (2013.01); *B32B 27/12* (2013.01); *B32B 27/32* (2013.01); *B32B 37/14* (2013.01); *B32B 2260/021* (2013.01); *B32B 2307/748* (2013.01); *Y10T 156/10* (2015.01); *Y10T 428/249934* (2015.04)

(58) Field of Classification Search
CPC ....... B32B 5/28; B32B 5/26; B32B 2307/748; B32B 7/06; B32B 7/12; B32B 5/29; B32B 27/32; B32B 2260/021; B32B 27/12; B29C 70/30; Y10T 156/10; Y10T 428/249934
USPC ................. 156/272.6, 60, 82; 428/295.4
See application file for complete search history.

(56) References Cited

U.S. PATENT DOCUMENTS

| | | | | |
|---|---|---|---|---|
| 5,597,631 A * | 1/1997 | Furumoto | ............. | B29C 70/086 428/34.5 |
| 6,139,942 A * | 10/2000 | Hartness | ............... | B29B 15/105 428/297.4 |
| 7,261,930 B2 * | 8/2007 | Ellis | ...................... | B29C 70/086 428/114 |
| 7,709,404 B2 | 5/2010 | Kruger et al. | | |
| 2011/0192535 A1 | 8/2011 | Turner | | |
| 2012/0100335 A1 * | 4/2012 | Ellis | ...................... | B29C 70/025 428/114 |

FOREIGN PATENT DOCUMENTS

| | | |
|---|---|---|
| AT | 50136-2012 | 4/2012 |
| EP | 2607411 | 6/2013 |
| WO | 2009/118536 | 10/2009 |

\* cited by examiner

*Primary Examiner* — Camie S Thompson
(74) *Attorney, Agent, or Firm* — W. Mark Bielawski; David J. Oldenkamp

(57) ABSTRACT

Prepregs comprising fibrous reinforcing material and a heat curable resin are provided with a backing sheet whose surface has been treated to increase the surface tension which enhances the bonding between the prepreg and the backing sheet, and reduces resin removal when the backing sheet is removed. The use of the treated backing sheet also provides improved tack between prepregs when assembled in a stack for molding after removal of the backing sheet.

13 Claims, No Drawings

PREPREG MATERIALS

BACKGROUND OF THE INVENTION

1. Field of the Invention

The present invention relates to prepegs and their production and use. Prepegs are materials made of fibres and a resin, usually a liquid resin, that can be cured usually by heat. Prepegs are usually supplied to the user on a backing sheet which is removed from the prepreg to enable a stack of prepegs to be cured in a mould, an autoclave or a vacuum bag to produce a desired laminar structure.

2. Description of Related Art

The present invention relates to prepregs comprising fibre reinforcing layers encapsulated by a curable resin and provided with a backing sheet. Such prepregs may be stacked and cured to produce laminar structures that are strong and lightweight. The backing sheet provides support to the prepreg to enable handling and it may also be used as a carrier to bring the resin into contact with the fibrous material during prepreg manufacture. The laminar structures are well known and find many uses in industrial applications such as automotive, aerospace and marine applications and also in wind turbine structures such as the shells used for turbine blade production, the spars and the root ends of the spars. They are also used for sporting goods such as for skis, skate boards, surf boards, windsurfers and the like.

The fibrous material employed in the prepregs may be tows or woven or non-woven fabrics and are chosen according to the final use and desired properties of the final moulded laminate. This invention is particularly concerned with systems in which the reinforcing fibre consists of unidirectional multifilament tows such as a plurality of substantially parallel tows and each tow comprises a multitude of individual substantially parallel filaments. Examples of fibrous materials that may be used include glass fibre, carbon fibre and Aramid. The curable, typically thermosetting resin that is used will depend upon the use to which the laminate is to be put and the properties required. Examples of suitable thermosetting resins include polyurethane resins and epoxy resins. This invention is particularly concerned with prepregs employing thermosetting liquid epoxy resins.

Prepregs can be prepared by impregnating the fibrous material with the resin in liquid form. Some resins are liquid at ambient temperature and impregnation can therefore be achieved at ambient temperature. However, usually it is preferred to heat the resin to reduce its viscosity to aid impregnation. Other resins are semi-solid or solid at ambient temperature and are melted to enable impregnation of the fibrous material with a liquid resin.

The impregnation of the fibrous material may be achieved by depositing the resin on the backing layer for example, by passing the backing layer through a bath of the liquid resin and coating the resin on the backing layer by means of a doctor blade. The surface of the backing layer carrying the resin may then be brought into contact with the fibrous material and be pressed into the fibrous layer to achieve impregnation of the fibrous layer with the resin. Alternatively a moving film of resin may be brought into contact with a moving backing layer and then brought into contact with a fibrous layer in a pair of heated nip rollers. In most previous applications it is preferred to employ two layers of resin one on each side of the fibrous layer to produce a sandwich structure to which pressure is applied to cause the resin to flow into the fibrous layer to fully impregnate the layer to form a conventional prepreg, so that the layer largely contains fibres which are frilly embedded in resin and no air remains in the layer. These prepregs have a resin content in the prepreg ranging from 25 to 45% by weight of the prepreg.

Although the backing layer may be used in prepreg manufacture it is provided to support the prepreg during handling such as reeling of the prepreg and to provide protection during transport of the prepreg. It must therefore have sufficient adhesion to form a bond with the resin in the prepreg. The backing layer is however removed so that the prepregs may be formed into a stack in the mould, autoclave or vacuum bag where they are shaped and cured. It is therefore important that when the backing is removed it does not remove significant amounts of resin. It is also desirable that there is sufficient resin at the surface of the prepreg after removal of the backing sheet to get good adhesion between the prepregs in the stack that is formed in mould, autoclave or vacuum bag to avoid irregularities in the final laminar structure due to inadequate bonding between the layers.

United States Patent Application Publication 2011/0192535, the contents of which is hereby incorporated by reference, describes providing corona discharge treated backing material to pre-cut pieces of prepreg material in order to better retain the desired orientation of the fibres within the prepreg. The prepreg provided with the backing sheet is fed to a machine in which the prepreg with the backing sheet attached is cut into individual pieces of the desired size which are then formed into the required shape. The backing sheet is then removed to enable a stack of the preformed prepregs to be created in a mould.

SUMMARY OF THE INVENTION

The present invention aims to obviate or at least mitigate the above described problems and/or to provide improvements generally.

According to the invention, there is provided a use, a moulding material, and a structure as defined in any one of the accompanying claims.

In an embodiment, the invention provides the use of a backing sheet whose surface has been treated to increase its surface tension for the protection of a prepreg comprising fibres within a curable resin between prepreg manufacture and lay up of sections of the prepreg to produce a laminar structure by curing the resin.

Preferably, the fibres are continuous uniaxially oriented fibres. This means that the fibres are all extending in an axial direction so that the uniaxially oriented fibres form fibre tows. The laying up and curing may be performed in a mould, an autoclave or a vacuum bag.

In a further embodiment, the backing sheet may remain present on one or more of the prepreg layers during moulding and/or curing. After the laminar structure has been cured, the backing sheet may be removed. This has the important advantage that no mould release material is required, as the backing sheet acts as a mould release material to promote release of the cured laminar structure from the mould.

The above described and many other features and attendant advantages of the present invention will become better understood by reference to the following detailed description.

DETAILED DESCRIPTION OF THE INVENTION

The backing sheet may be of any suitable material. Polymer films are particularly suitable as the surface tension at their surfaces can be increased by treatments such as corona discharge or flame treatment. Corona discharge being preferred. Polyethylene films such as low density polyethylene films of thickness from 1 to 6 mils are particularly useful although the preferred thickness will depend upon the weight of the prepreg and the materials employed within the prepreg. Films of polyurethane polyamides, polyester or fluorinated hydrocarbons may also be used. We prefer that the treated surface of the backing material have a surface tension within the range of 44 to 48 mN/m. The backing sheet may be treated on one or both surfaces but it is preferred to treat only on the surface that is brought into contact with the prepreg prior to handling of the prepreg, such as by reeling and transport of the prepreg.

The increase in surface tension of the backing sheet has been found to draw liquid resin to the surface of the prepreg. This increases the surface tack of the prepreg which increases the adhesion of the prepreg to the backing sheet and reduces the likelihood of the backing sheet becoming detached from the prepreg during handling. Additionally the increase in resin at the surface provides greater surface tack which leads to a beneficial improvement in the adhesion between layers of the prepreg when they are laid up in the mould after removal of the backing sheet. This is particularly useful when working with prepregs having a reduced resin content such as those described in Austrian Patent application A50136/2012, the contents of which is hereby incorporated by reference. In a preferred system the adhesion of the backing sheet to the prepreg is preferably in the range of 0.1 to 0.2 when measured according to the Dubois test described below. Additionally, it is preferred that the adhesion between the layers in the mould, autoclave or vacuum bag after removal of the backing sheet and prior to curing of the resin is in the range of 0.1 to 0.45. We have found that surface treatment of the backing sheet according to this invention allows this combination of desirable properties to be achieved.

The invention is applicable to any prepreg containing unidirectional, bidirectional or multidirectional fibres which may be glass, aramid or carbon fibre. Carbon fibre being preferred. The invention is particularly useful with prepregs comprising a layer of fibrous reinforcement and a curable liquid resin wherein the fibrous reinforcement comprises a plurality of tows, particularly parallel tows, each tow comprising a plurality of filaments wherein resin is provided at least partially between interstices between tows of the fibrous reinforcement to provide an air venting path in at least the interior of the tows. In a preferred embodiment the interior of the tows is at least partially resin free to provide an air venting path to allow air to be removed during processing of the material or structure.

The interstitial resin ensures that the material when provided with the backing sheet has adequate structure at room temperature to allow handling of the material. This is achieved because at room temperature (23° C.), the resin has a relatively high viscosity, typically in the range of from 1000 to 100,000 Pa·s, more typically in the range of from 5000 Pa·s to 500,00 Pa·s. Also, the resin may be tacky. Tack is a measure of the adhesion of a prepreg to the backing sheets to a tool surface, to other prepreg plies in an assembly. Tack may be measured in relation to the resin itself or in relation to the prepreg in accordance with the method as disclosed in "Experimental analysis of prepreg tack", Dubois et al, (LaMI)UBP/IFMA, 5 Mar. 2009, the contents of which is hereby incorporated by reference. This publication discloses that tack can be measured objectively and repeatably by using the equipment as described therein and by measuring the maximum debonding force for a probe which is brought in contact with the resin or prepreg at an initial pressure of 30 N at a constant temperature of 30° C. and which is subsequently displaced at a rate of 5 mm/min. For these probe contact parameters, the tack $F/F_{ref}$ for the resin is in the range of from 0.1 to 0.6 where $F_{ref}$=28.19N and F is the maximum debonding force. For a prepreg, the tack $F/F_{ref}$ is in the range of from 0.1 to 0.45 for $F/F_{ref}$ where $F_{ref}$=28.19 N and F is the maximum debonding force. However, a fibrous support web, grid or scrim may also be located on at least one exterior surface of the fibrous reinforcement to further enhance the integrity of the material or structure during handling, storage and processing.

In a further embodiment, the prepreg comprises unimpregnated tows and at least partially impregnated tows. Preferably the reinforcement comprises unimpregnated tows ("dry tows") and completely impregnated tows. The layer of fibrous reinforcement comprises air venting tows at least partially embedded in at least partially impregnated fibrous reinforcement. The partially impregnated fibrous reinforcement may be a unidirectional reinforcement or a woven fibrous reinforcement or a non-woven fibrous reinforcement.

The prepreg may be formed from two or more separate layers of fibrous reinforcement, one layer being impregnated with resin and the other layer being unimpregnated or substantially unimpregnated, the two layers being conjoined so that resin is present between the interstices of the tows. Preferably the layers are conjoined so that the unimpregnated or substantially unimpregnated tows are at least partially embedded among impregnated tows.

The layers may comprise unidirectional tows, the tows of each layer being substantially parallel. The two layers may be conjoined by compression so that the unidirectional tows are in the same plane. One or more additional fibrous layers may also be combined with the conjoined layers.

The interstices between the tows may comprise filaments. The interstices may comprise filaments of a single tow or filaments of tows on either side of the interstices. The interstices containing tow filaments form an integral structure of the moulding material or structure so that this can be handled, rolled up and/or stored without distortion of the fibre orientation and resin to fibre volume ratio and/or weight ratio. This ensures that the material is stable.

In a further embodiment, the resin may be provided on the first side of the fibrous reinforcement and at least partially penetrates the interstices between the tows of the fibrous reinforcement to leave the interior of the tows at least partially resin free.

The present invention therefore provides a moulding material or structure comprising a prepreg of unidirectional fibrous reinforcement and a curable liquid resin wherein the fibrous reinforcement comprises a plurality of multifilament tows wherein resin is provided on the first side of the fibrous reinforcement and at least partially penetrates the interstices between the tows of the fibrous reinforcement and leaves the interior of the tows at least partially resin fee wherein the layer is provided with a backing sheet that has been surface treated to increase its surface tension on the side in contact with the prepreg.

In a further embodiment the prepreg comprises a layer of fibrous reinforcement and a curable liquid resin wherein the layer of fibrous reinforcement comprises a plurality of unidirectional multifilament tows wherein resin is provided on a first side of the layer of fibrous reinforcement and wherein the interstices between the tows are at least partially impregnated with the resin and the resin no more than partially penetrates the interior of the individual tows and the second side of the layer of fibrous reinforcement is at least partially resin free. In this embodiment the surface treated backing sheet is provided on the first side of the layer.

In a further embodiment a fibrous web or scrim is adhered to the fibrous layer by light pressure, so that less than half the circumference of the web or scrim fibres are coated by resin. In another embodiment the moulding material or structure is provided with a supporting web or scrim on one or both sides of the structure.

In another embodiment, the fibrous web or scrim may be located in the interstices between tows. In a preferred embodiment the scrim is arranged on at least the first side of the layer of fibrous reinforcement whereby part of the scrim is in the interstices between tows. The scrim in the interstices provides a venting path in the intralaminar and interlaminar directions. This thus provides extraction of any entrapped air or other gaseous matter in the x, y and z direction of the material. This is advantageous when multiple layers of the moulding material form a laminate structure. Another benefit of this embodiment is that the application of a single fibrous web or scrim results in a product which is essentially symmetrical. This allows the material to be applied irrespective of its orientation in relation to the lay-up. Another benefit of an essentially symmetrical material is that it can be applied from a roll to a stack in consecutive forward and backward motions, whereas an asymmetrical material must be deposited on the forward motion Only and the backward motion used to restore the drum to its original position. A stack made with a symmetrical material can therefore, be made more quickly and with less energy.

The scrim or web when used is preferably wide-meshed and may be made of any suitable material, but thermoplastic yarns are preferred. The key requirement of the yarn material is that is has a melting point similar to or higher than the prepreg gelling temperature so that the scrim yarns do not melt during the curing process. Preferably, the difference between yarn melt point and the matrix gelling point should be at least 10° C. Suitable materials for the scrim include polyester (76-1100 dtex) such as polyethylene terephthalate and polybutylene terephthalate and copolymers thereof, polyamide (110-700 dtex) such as nylon 6, nylon 66, nylon 11, and nylon 12, polyethersulphone, polypropylene, viscose staple yarn (143-1000 dtex), meta and para-amid (Kevlar 29 200-1100 dtex) and Nomex T-430 220-1300 dtex, glass 220-1360 dtex), jute (2000 dtex), flax (250-500 dtex), cotton (200-500 dtex) and combinations of one or more of these. Such material is available under the Bafatex tradename from Bellingroth GmbH.

The strands which form the scrim preferably have a substantially round cross-section. The diameters of the strands may be in the range of from 100 to 1000 micrometer, preferably 200 to 600 micrometer and more preferably from 300 to 400 micrometer. If the scrim fiber diameters are too large, then mechanical properties of the laminate may be adversely affected. For example, both interlaminar shear strength and compression strength were found to decrease.

In this embodiment it is preferred that the strands of the scrim or web are not fully impregnated by the resin. This aids with the venting of interlaminar air between the prepreg layers. The degree by which the strands of the scrim are coated with resin can be expressed by the degree of impregnation (DI). The DI indicates to which degree the circumference of the scrim strands are covered with resin. Therefore, an impregnation index of 1.0 means that the strands are fully impregnated by the resin and an impregnation index of 0.5 indicates, that half of the circumference of the grid strands is coated by the resin. The invention requires that the scrim strands are covered with the prepreg resin to a minimum degree, just sufficient in order that the scrim will adhere to the prepreg to assure safe handling. It must not be covered by the resin, however, to 50% of the circumference of the strands or more, to assure the proper provision of air escape channels. Therefore, expressed as a "degree of impregnation", the invention requires that the degree of impregnation is between >0 and <0.5 and preferably between 0.2 and 0.3.

To assure that the outward ends of the air channels provided along the scrim strands do not become clogged by the prepreg resin, the scrim should extend outwardly beyond the edges of the prepreg. Preferably the scrim should jut out over the edges of the prepreg by 2 to 30, in particular by 10 to 20 mm.

In another embodiment, a scrim or web may be present on one or both surfaces of the prepreg.

When used the structure of the scrim is of importance and consists of two main elements. In the 0 DEG or warp direction, the yarns are used to primarily stabilize those yarns that are aligned in other directions even when under tension in a wound-up roll. Other yarns, that run in a crosswise direction to the warp yarns form parallelograms. In general the grid forms a coarse net in which the parallel strands of the parallelogram have a distance of 3 to 60, preferably 10 to 35 and most preferably 20 to 30 mm from each other.

For the escape of the air the short channels to the lateral edges of the prepreg formed by the strands in roughly cross-direction are of importance. Preferably the scrim should include parallelograms with side lengths of 10 to 35 mm, wherein the smaller angle of the parallelogram is between 50 and 80, preferably between 65 and 75 DEG. Therefore the scrim preferably should comprise strands in longitudinal direction, which is the running direction of the sheet, and strands in roughly cross-direction to the running direction of the sheet. With such a scrim construction during the press moulding of the prepreg lay-ups, also advancing in longitudinal direction, the air will first advance along the longitudinal strands up to a point, where the longitudinal strand meets a strand in cross-direction, from where the air will escape outwardly along a strand in cross-direction. These strands in cross-direction create a short way outwardly. In this connection, also the angle between the strands in longitudinal direction and the strands in roughly cross-direction is of practical importance.

The prepregs of the invention may be characterized by its resin content and/or its fibre volume and resin volume and/or its degree of impregnation as measured by the water up take test.

Resin and fibre content of uncured moulding materials or structures are determined in accordance with ISO 11667 (method A) for moulding materials or structures which contain fibrous material which does not comprise unidirectional carbon. Resin and fibre content of uncured moulding materials or structures which contain unidirectional carbon fibrous material are determined in accordance with DIN EN 2559 A (code A). Resin and fibre content of cured moulding materials or structures which contain carbon fibrous material are determined in accordance with DIN EN 2564 A.

The fibre and resin volume % of a prepreg moulding material or structure can be determined from the weight % of fibre and resin by dividing the weight % by the respective density of the resin and carbon fibre.

The % of impregnation of a tow or fibrous material which is impregnated with resin is measured by means of a water pick up test.

The water pick up test is conducted as follows. Six strips of prepreg are cut of size 100 (+/−2) mm×100 (+/−2) mm. Any backing sheet material is removed. The samples are weighed near the nearest 0.001 g (W1). The strips are located between PTFE backed aluminium plates so that 15 mm of the prepreg strip protrudes from the assembly of PTFE backed plates on one end and whereby the fibre orientation of the prepreg is extends along the protruding part. A clamp is placed on the opposite end, and 5 mm of the protruding part is immersed in water having a temperature of 23° C., relative air humidity of 50%+/−35%, and at an ambient temperature of 23° C. After 5 minutes of immersion the sample is removed from the water and any exterior water is removed with blotting paper. The sample is then weighed again W2. The percentage of water uptake WPU (%) is then calculated by averaging the measured weights for the six samples as follows: WPU (%)=[(<W2>−<W1>)/<W1>)×100. The WPU (%) is indicative of the Degree of Resin Impregnation (DRI).

The same method can be conducted for individual tows—in that case, multiple tows (typically 25 up to 50) are located between the PTFE backed plates and they are treated in the same way by immersion in water, and the WPU % is then calculated for the tows by calculating the average values for W1 and W2 as outlined above.

Typically, the values for the resin content by weight for the uncured prepreg of the invention are in the ranges of from 15 to 70% by weight of the prepreg, from 18 to 68% by weight of the prepreg, from 20 to 65% by weight of the prepreg, from 25 to 60% by weight of the prepreg, from 25 to 55% by weight of the prepreg, from 25 to 50% by weight of the prepreg, from 25 to 45% by weight of the prepreg, from 25 to 40% by weight of the prepreg, from 25 to 35% by weight of the prepreg, from 25 to 30% by weight of the prepreg, from 30 to 55% by weight of the prepreg, from 35 to 50% by weight of the prepreg and/or combinations of the aforesaid ranges.

Typically, the values for the resin content by volume for the uncured prepreg of the invention are in the ranges of from 15 to 70% by volume of the prepreg, from 18 to 68% by volume of the prepreg, from 20 to 65% by volume of the prepreg, from 25 to 60% by volume of the prepreg from 25 to 55% by volume of the prepreg, from 25 to 50% by volume of the prepreg, from 25 to 45% by volume of the prepreg, from 25 to 40% by volume of the prepreg, from 25 to 35% by volume of the prepreg, from 25 to 30% by volume of the prepreg, from 30 to 55% by volume of the prepreg, from 35 to 50% by volume of the prepreg and/or combinations of the aforesaid ranges.

Finally, the values for the resin content by volume for the uncured prepreg tows of the invention are in the ranges of from 15 to 70% by volume of the prepreg tow, from 18 to 68% by volume of the prepreg tow, from 20 to 65% by volume of the prepreg tow, from 25 to 60% by volume of the prepreg tow, from 25 to 55% by volume of the prepreg tow, from 25 to 50% by volume of the prepreg tow, from 25 to 45% by volume of the prepreg tow, from 25 to 40% by volume of the prepreg tow, from 25 to 35% by volume of the prepreg tow, from 25 to 30% by volume of the prepreg tow, from 30 to 55% by volume of the prepreg tow, from 35 to 50% by volume of the prepreg tow and/or combinations of the aforesaid ranges. The values for the resin content by weight for the uncured prepreg tows of the invention are in the ranges of from 15 to 70% by weight of the prepreg tow, from 18 to 68% by weight of the prepreg tow, from 20 to 65% by weight of the prepreg tow, from 25 to 60% by weight of the prepreg tow, from 25 to 55% by weight of the prepreg tow, from 25 to 50% by weight of the prepreg tow, from 25 to 45% by weight of the prepreg tow, from 25 to 40% b weight of the prepreg tow, from 25 to 35% by weight of the prepreg tow, from 25 to 30% by weight of the prepreg tow, from 30 to 55% by weight of the prepreg tow, from 35 to 50% by weight of the prepreg tow and/or combinations of the aforesaid ranges.

Water pick up values for the uncured prepreg moulding material and tows of the invention may be in the range of from 1 to 90%, 5 to 85%, 10 to 80%, 15 to 75%, 15 to 70%, 15 to 60%, 15 to 50%, 15 to 40%, 15 to 35%, 15 to 30%, 20 to 30%, 25 to 30% and/or combinations of the aforesaid ranges. In a further embodiment the prepreg may be prepared by a method in which a layer of unidirectional fibrous tows which are fully impregnated with liquid resin maybe superimposed on a layer of dry unimpregnated unidirectional fibrous tows and the structure consolidated so that the resin penetrates the spaces between the unimpregnated tows but leaves the spaces between the filaments within the tows at least partially unimpregnated. A supporting web or scrim may be provided on one or both sides of the structure preferably before consolidation.

The term prepreg is used herein to describe a moulding material or structure in which the fibrous material has been impregnated with the liquid resin to the desired degree and the liquid resin is substantially uncured.

The tows employed in the present invention are made up of a plurality of individual filaments. There may be many thousands of individual filaments in a single tow. The tow and the filaments within the tow are generally unidirectional with the individual filaments aligned substantially parallel. In a preferred embodiment the tows within the moulding material or structure of the invention are substantially parallel to each other and extend along the direction of travel employed for the processing of the structure. Typically the number of filaments in a tow can range from 2,500 to 10,000 to 50,000 or greater. Tows of about 25,000 carbon filaments are available from Toray and tows of about 50,000 carbon filaments are available from Zoltek.

Leaving the interior of the tows at least partially resin free provides an air venting path or structure, so that air that may be present in the tows from the outset or that may be introduced during impregnation with the liquid resin is not trapped within the structure of the prepreg by the resin and can escape during preparation and consolidation of the prepreg. The air is able to escape along the length of the tows and also from the second side of the fibrous layer if the impregnation by the resin is such that some or all of the surface of the second side of the fibrous layer is not carrying resin. Furthermore, the provision of the spaces between the filaments of the tows will allow air trapped between the prepregs during stack formation to escape particularly if, in addition, one side of the prepreg is not entirely coated with resin.

The prepregs employed in this invention may be produced from normally available epoxy resins which may contain a hardener and optionally an accelerator. In a preferred embodiment the epoxy resin is free of a traditional hardener such as dicyandiamide and in particular we have found that these desirable prepregs can be Obtained by use of a urea based or urea derived curing agent in the absence of a hardener such as dicyandiamide. The relative amount of the curing agent and the epoxy resin that should be used will depend upon the reactivity of the resin and the nature and quantity of the fibrous reinforcement in the prepreg. Typically from 0.5 to 10 wt % of the urea based or urea derived curing agent based on the weight of epoxy resin is used.

The prepregs of this invention are typically used at a different location from where they are manufactured and they therefore require handleability. It is therefore preferred that they are dry or as dry as possible and have low surface tack particularly on a surface of the prepreg that is not provided with a backing sheet. It is therefore preferred to use high viscosity liquid curable resins. The invention has the additional added benefit that the prepregs of the invention have improved storage stability.

The backing sheet facilitates handling of the material and/or rolling up of the material. The backing sheet may comprise a polyolefin based material such as polyethylene, polypropylene and/or copolymers thereof. The backing sheet may comprise embossing. This has the advantage of providing the prepreg with an air venting surface structure. The air venting surface structure comprising embossed channels which allow air to escape during processing. This is particularly useful as this prevents interply entrapment as interply air is effectively removed via the air venting surface channels.

In order to produce final laminates with substantially uniform mechanical properties it is important that the structural fibres and the epoxy resin be mixed to provide a substantially homogenous prepreg. This requires uniform distribution of the structural fibres within the prepreg to provide a substantially continuous matrix of the resin surrounding the fibrous tows whilst leaving the interstices within the tows at least partially resin free. The preferred prepregs contain a low level of voids between the tows. It is therefore preferred that each prepreg and the prepreg stack has a water pick-up value of less than 15 or less than 9%, more preferably less than 6%, most preferably less than 3%. The water pick-up test previously described determines the degree of waterproofing or impregnation between the unidirectional tows of the prepregs of this invention. The smaller the amount of water picked up, the higher the degree of waterproofing or impregnation.

The prepregs of this invention are intended to be laid-up with other composite materials (e.g. other prepregs which may also be according to this invention or they may be other prepregs) to produce a curable laminate or a prepreg stack. The prepreg is typically produced as a roll of prepreg and in view of the tacky nature of such materials, with a backing sheet provided to enable the roll to be unfurled at the point of use.

The prepregs of this invention are produced by impregnating the fibrous material with the epoxy resin. The viscosity of the resin and the conditions employed for impregnation are selected to enable the desired degree of impregnation. It is preferred that during impregnation the resin has a viscosity of from 0.1 Pa·s to 100 Pa·s, preferably from 6 to 100 Pa·s, more preferably from 18 to 80 Pa·s and even more preferably from 20 to 50 Pa·s. In order to increase the rate of impregnation, the process may be carried out at an elevated temperature so that the viscosity of the resin is reduced. However it must not be so hot for a sufficient length of time that premature curing of the resin occurs. Thus, the impregnation process is preferably carried out at temperatures in the range of from 40° C. to 110° C. More preferably 60° C. to 80° C. It is preferred that the resin content of the prepregs is such that after curing the structure contains from 30 to 40 wt %, preferably 31 to 37 wt % more preferably 32 to 35 wt % of the resin. The relative amount of resin and multifilament tow, the impregnation line speed the viscosity of the resin and the density of the multifilament tows should be correlated to achieve the desired degree of impregnation between the tows and to leave spaces between the individual filaments within the tows which are unoccupied by the resin.

The resin can be spread onto the external surface of a roller and coated onto the backing sheet which may be paper or other backing material to produce a layer of curable resin. The resin composition can then be brought into contact with the multifilament tows for impregnation perhaps by the passage through rollers. The resin may be present on the treated side of one or two of the surface treated backing sheets, which are brought into contact with one or both sides of the tows and consolidated such as by passing them through heated consolidation rollers to cause the desired degree of impregnation. Alternatively, the resin may be applied via a resin bath by conducting the tows through the resin (direct fibre impregnation) and the backing sheet provided after impregnation. The resin may also comprise a solvent winch is evaporated following impregnation of the fibre tows.

In the impregnation processes the resin can be maintained in liquid forum in a resin bath either being a resin that is liquid at ambient temperature or being molten if it is a resin that is solid or semi-solid at ambient temperature. The liquid resin can then be applied to the backing sheet employing a doctor blade to produce a resin film on the backing sheet which acts as a release layer. The fibre tows may then be placed into the resin and optionally a second resin layer may be provided on top of the fibre tows and then consolidated.

In a further embodiment for the preparation of the prepreg a resin impregnated fibrous layer may be superimposed on a substantially resin free layer of unidirectional tows and the combination pressed together so that the resin from the impregnated layer passes into the resin free layer so that the resin enters between the tows but leaves at least part of the interstices within the tows at least partially resin free.

In this embodiment a layer comprising unidirectional fibre tows with a high degree of impregnation by liquid resin can be superimposed on a layer of substantially unimpregnated unidirectional fibre tows and the structure consolidated so that the liquid resin passes from the impregnated layer into the substantially unimpregnated layer to cause partial impregnation. Partial impregnation results in resin between the tows and leaving spaces between the filaments of the tows which do not contain resin. The partial impregnation may be such that the side of the layer of substantially unimpregnated tows remote from the resin containing layer remains dry or partially dry. Alternatively it may be wetted according to the moulding conditions to be employed for curing a stack of the prepregs. The backing sheet should be provided on the wet surface of the prepreg.

The backing sheet can be applied either before or after impregnation of the resin. However, it is typically applied before or during impregnation as it can provide a non-stick surface upon which to apply the pressure required for causing the resin to impregnate the fibrous layer.

Epoxy resins were preferred in the preparation of the prepreg and the epoxy resin preferably has an Epoxy Equivalent Weight (EEW) in the range from 150 to 1500 preferably a high reactivity such as an EEW in the range of from 200 to 500 and the resin composition comprises the resin and an accelerator or curing agent. Suitable epoxy resins may comprise blends of two or more epoxy resins selected from monofunctional, difunctional, trifunctional and/or tetrafunctional epoxy resins.

Suitable difunctional epoxy resins, by way of example, include those based on: diglycidyl ether of bisphenol F, diglycidyl ether of bisphenol A (optionally brominated), phenol and cresol epoxy novolacs, glycidyl ethers of phenolaldelyde adducts, glycidyl ethers of aliphatic diols, diglycidyl ether, diethylene glycol diglycidyl ether, aromatic epoxy resins, aliphatic polyglycidyl ethers, epoxidised olefins, brominated resins, aromatic glycidyl amines, heterocyclic glycidyl imidines and amides, glycidyl ethers, fluorinated epoxy resins, glycidyl esters or any combination thereof.

Difunctional epoxy resins may be selected from diglycidyl ether of bisphenol F, diglycidyl ether of bisphenol A, diglycidyl dihydroxy naphthalene, or any combination thereof.

Suitable trifunctional epoxy resins, by way of example, may include those based upon phenol and cresol epoxy novolacs, glycidyl ethers of phenol-aldehyde adducts, aromatic epoxy resins, aliphatic triglycidyl ethers, dialiphatic triglycidyl ethers, aliphatic polyglycidyl amines, heterocyclic glycidyl imidines and amides, glycidyl ethers, fluorinated epoxy resins, or any combination thereof. Suitable trifunctional epoxy resins are available from Huntsman Advanced Materials (Monthey, Switzerland) under the tradenames MY0500 and MY0510 (triglycidyl para-aminophenol) and MY0600 and MY0610 (triglycidyl meta-aminophenol). Triglycidyl meta-aminophenol is also available from Sumitomo Chemical Co. (Osaka, Japan) under the tradename ELM-120.

Suitable tetrafunctional epoxy resins include N,N,N',N'-tetraglycidyl-m-xylenediamine (available commercially from Mitsubishi Gas Chemical Company under the name Tetrad-X, and as Erisys GA-240 from CVC Chemicals), and N,N,N',N'-tetraglycidylmethylenedianiline (e.g. MY0720 and MY0721 from Huntsman Advanced Materials). Other suitable multifunctional epoxy resins include DEN438 (from Dow Chemicals, Midland, Mich.) DEN439 (from Dow Chemicals), Araldite ECN 1273 (from Huntsman Advanced Materials), and Araldite ECN 1299 (from Huntsman Advanced Materials).

The epoxy resin composition preferably also comprises one or more urea based curing agents and it is preferred to use from 0.5 to 10 wt % based on the weight of the epoxy resin of a curing agent, more preferably 1 to 8 wt %, more preferably 2 to 8 wt %. Preferred urea based materials are the range of materials available under the commercial name Urone®. In addition to a curing agent, a suitable accelerator such as a latent amine-based curing agent, such as dicyanopolyamide (DICY) may be used.

Accordingly, the present invention provides a prepreg moulding material for manufacturing a fibre-reinforced composite material, the prepreg comprising a layer of fibrous reinforcement fully impregnated by a matrix resin material, wherein the resin material has a storage modulus G' of from $3\times10^5$ Pa to $1\times10^8$ Pa and a loss modulus G" of from $2\times10^6$ Pa to $1\times10^8$ Pa provided with a backing sheet on at least one surface wherein the backing sheet has been treated on at least one surface to increase it's surface tension.

Preferably, the resin material has a storage modulus G' of from $1\times10^6$ Pa to $1\times10^7$ Pa, more preferably from $2\times10^6$ Pa to $4\times10^6$ Pa.

Preferably, the resin material has a loss modulus G" of from $5\times10^6$ Pa to $1\times10^7$ Pa, more preferably from $7\times10^6$ Pa to $9\times10^6$ Pa.

Preferably, the resin material has a complex viscosity of from $5\times10^5$ to $1\times10^7$ Pa·s, more preferably from $7.5\times10^5$ Pa to $5'10^6$ Pa·s.

Preferably, the resin material has a complex viscosity of from $1\times10^6$ to $2\times10^6$ Pa·s. and more preferably from 5 to 30 Pa·s at 80° C. Preferably, the resin material has a viscosity of from 10 to 25 Pa·s at 80° C. Preferably, the resin material is an epoxy resin.

We have discovered that the aforesaid storage modulus and loss modulus properties allow the air venting structure to remain in place during handling and storage and to remain in place during lay-up of the prepreg with the backing sheet attached to the prepreg and up to the start of processing after removal of the backing sheet when the laminate stack is heated up to temperatures over 40° C. and a vacuum pressure is applied, even if multiple plies (stacks of 20, 30, 40, 60 or even more plies) are laid up.

Preferably, the prepreg moulding material is elongate in a longitudinal direction thereof and the fibrous reinforcement is unidirectional along the longitudinal direction of the prepreg.

Preferably, the opposed major surfaces of the prepreg moulding material or structure are embossed with an array of channels therein.

After removal of the backing sheet the behaviour of thermosetting prepreg materials is highly viscoelastic at the typical lay-up temperatures used. The elastic solid portion stores deformation energy as recoverable elastic potential, whereas a viscous liquid flows irreversibly under the action of external forces.

This complex viscosity is obtained using a rheometer to apply an oscillation experiment. From this the complex modulus G* is derived as the complex oscillation which is applied to the material is known (Principles of Polymerization, John Wiley & Sons, New York, 1981).

In viscoelastic materials the stress and strain will be out of phase by an angle delta. The individual contributions making the complex viscosity are defined as G'(Storage Modulus)=G*×cos(delta); G"(Loss Modulus)=G*×sin (delta). This relationship is shown in FIG. 8 of WO 2009/118536, the contents of which is hereby incorporated by reference.

G* is the complex modulus. G' relates to how elastic the material is and defines its stiffness. G" relates to how viscous a material is and defines the damping, and liquid non recoverable flow response of the material.

For a purely elastic solid (glassy or rubbery), G"=0 and the phase angle delta is 0°, and for a purely viscous liquid, G'=0 and the phase angle delta is 90°.

The loss modulus G" indicates the irreversible flow behaviour and a material with a high loss modulus G" is also desirable to prevent the early creep-like flow and maintain an open air path for longer. Therefore the resin used in the prepregs of the present invention has a high storage modulus and a high loss modulus, and correspondingly a high complex modulus, at a temperature corresponding to a typical lay-up temperature, such as room temperature (20° C.).

The resin material preferably has a phase angle delta such that the value of delta increases by at least 25° over a temperature range of from 10 to 25° C. Optionally, the value of the phase angle delta increases by a value of from 25 to 70° over a temperature range of from 10 to 25° C. Optionally, the value of the phase angle delta between the complex modulus G* and the storage modulus G' increases by a value of from 35 to 65° over a temperature range of from 10 to 25° C. Optionally, the value of the phase angle delta is no more than 70° and/or at least 50° within the temperature range of from 12.5 to 25° C.

In this specification, the viscoelastic properties, i.e. the storage modulus, loss modulus and complex viscosity, of the resin used in the prepregs of the present invention were measured at application temperature (i.e. a lay-up temperature of 20° C.) by using a TA instruments AR2000 rheometer with disposable 25 mm diameter aluminium plates. The measurements were carried out with the following settings: an oscillation test at decreasing temperature reducing from 40° C. down to −10° C. at 2° C./mm with a controlled displacement of $1 \times 10^{-4}$ rads at a frequency of 1 Hz and a gap of 1000 micrometer.

Typically, the stiffness of the viscoelastic prepreg is characterised by the resin exhibiting a high elastic rheological response. The resin rheology is characterised by a storage modulus G' of the resin, preferably between $3 \times 10^5$ Pa and $1 \times 10^8$ Pa at 20° C., more preferably from $1 \times 10^6$ Pa to $1 \times 10^7$ Pa, yet more preferably from $2 \times 10^6$ Pa to $4 \times 10^6$ Pa. The higher the storage modulus at room temperature, the greater the air transport properties of the prepreg stack. However, the upper limit of the storage modulus is limited because otherwise the pre-preg would become too rigid and would develop a tendency to snap as the prepreg is being laminated even onto the gentle curvature typical in a wind turbine spar.

In the manufacture of a structural member in the form of a spar or beam using the prepreg moulding material or structure of the present invention, preferably the resin has a high loss modulus G" between $2 \times 10^6$ Pa and $1 \times 10^8$ Pa at 20° C., more preferably from $5 \times 10^6$ Pa to $1 \times 10^7$ Pa, yet more preferably from $7 \times 10^6$ Pa to $9 \times 10^6$ Pa.

The resin material preferably has a high complex viscosity at 20° C. of from $5 \times 10^5$ Pa to $1 \times 10^7$ Pa·s, more preferably from $7.5 \times 10^5$ Pa to $5 \times 10^6$ Pa·s, yet more preferably from $1 \times 10^6$ Pa to $2 \times 10^6$ Pa·s.

Furthermore, as stated above the viscosity of the resin in the moulding material is relatively high. This provides that prior to the curing stage, which is typically carried out an elevated temperature, for example at a temperature greater than 75° C., a typical curing temperature being, 80° C. or higher, the resin exhibits low or even negligible flow properties. The resin material preferably has a viscosity of from 5 to 30 Pa·s at 80° C., more preferably from 10 to 25 Pa·s at 80° C. In this specification, the resin flow viscosity (V) during the cure cycle was measured using a TA Instruments AR2000 rheometer with disposable 25 mm diameter aluminium plates. The measurement was carried out with the following settings: increasing temperature from 30 to 130° C. 2° C./mm with a shear stress of 3.259 Pa, gap: 1000 micrometer.

The term interstices as used in this application to define the space or volume which is present between adjacent tows. This space or volume may comprise filaments of one or more adjacent tows. The space or volume may be filled when the fibrous material is impregnated, either partly or completely.

It is often thought that interstices are important to allow venting of entrapped interlaminar or intralaminar air from laminate mouldings, however we have found that the interstices may be filled with resin, while the tows themselves, when not frilly impregnated as confirmed by for example the water pick up measurements, allow the venting of both interlaminar and intralaminar air. This results in moulding materials which have a very low void content as confirmed by the experiments in this application.

Furthermore, we have discovered that for the resin properties as defined herein combined with the provision of the surface treated backing sheet, the moulding material of the invention is very stable during manufacture, storage and handling so that the venting structure in the tows (and through embossing by the backing sheet) can remain in place up additionally during lay-up and until an advanced stage during processing of the laminate stack when the temperature is raised typically to values above 60° C.

The multifilament tows used in this invention may comprise cracked (i.e. stretch-broken), selectively discontinuous or continuous filaments. The filaments may be made from a wide variety of materials, such as carbon, basaltic fibre, graphite, glass, metalized polymers, aramid and mixtures thereof. Glass and carbon fibres tows are preferred carbon fibre tows, being preferred for wind turbine shells of length above 40 meters , such as from 50 to 60 meters . The structural fibres are individual tows made up of a multiplicity of unidirectional individual fibres. Typically the fibres will have a circular or almost circular cross-section with a diameter for carbon in the range of from 3 to 20 μm, preferably from 5 to 12 μm. For other fibres, including glass, the diameter may be in the range of from 3 to 600 μm, preferably from 10 to 100 μm. Different tows may be used in different prepregs according to the invention and different prepregs may be used together to produce a cured laminate according to the properties required of the cured laminate.

The reinforcing fibres may be synthetic or natural fibres or any other form of material or combination of materials that, combined with the resin composition of the invention, forms a composite product. The reinforcement web can either be provided via spools of fibre that are unwound or from a roll of textile. Exemplary fibres include glass, carbon, graphite, boron, ceramic and aramid. Preferred fibres are carbon and glass fibres. Hybrid or mixed fibre systems may also be envisaged. The use of cracked (i.e. stretch-broken) or selectively discontinuous fibres may be advantageous to facilitate lay-up of the product according to the invention and improve its capability of being shaped. Although a unidirectional fibre alignment is preferable, other forms may also be used. Typical textile forms include simple textile fabrics, knit fabrics, twill fabrics and satin weaves. It is also possible to envisage using non-woven or non-crimped fibre layers. The surface mass of fibres within the fibrous reinforcement is generally 80-4000 g/m², preferably 100-2500 g/m², and especially preferably 150-2000 g/m². The number of carbon filaments per tow can vary from 3000 to 320,000, again preferably from 6,000 to 160,000 and most preferably from 12,000 to 48,000. For fiberglass reinforcements, fibres of 600-2400 tex are particularly adapted.

Exemplary layers of unidirectional fibrous tows are made from HexTow® carbon fibres, which are available from Hexcel Corporation. Suitable HexTow® carbon fibres for use in making unidirectional fibre tows include: IM7 carbon fibres, which are available as tows that contain 6,000 or 12,000 filaments and weight 0.223 g/m and 0.446 g/m respectively; IM8-IM10 carbon fibres, which are available as tows that contain 12,000 filaments and weigh from 0.446 g/m to 0.324 g/m; and AS7 carbon fibres, which are available in tows that contain 12,000 filaments and weigh 0.800 g/m, tows containing up to 80,000 or 50,000 (50K) filaments may be used such as those containing about 25,000 filaments available from Toray and those containing about 50,000 filaments available from Zoltek. The tows typically have a width of from 3 to 7 mm and are fed for impregnation on equipment employing combs to hold the tows and keep them parallel and unidirectional.

A stack of prepregs for preparing cured laminates may contain more than 40 prepreg layers from which the backing sheet has been removed, typically more than 60 layers and at times more than 80 layers, some or all of which are prepregs obtained from the present invention. One or more of the prepreg layers in the stack may be cured or precured to part process the resin in the prepreg layer. It is however preferred that all the prepregs are according to the invention. Typically the stack will have a thickness of from 1 cm. to 10 cm, preferably from 2 cm to 8 cm, more preferably from 3 to 6 cm.

Epoxy resins can become brittle upon curing and toughening materials can be included with the resin to impart durability although they may result in an undesirable increase in the viscosity of the resin. Alternatively as described in Application No. EP41195218.0 the toughening material may be supplied as a separate layer such as a veil. The contents of EP11195218.0 is hereby incorporated by reference.

Where the additional toughening material is a polymer it should be insoluble in the matrix epoxy resin at room temperature and at the elevated temperatures at which the resin is cured. Depending upon the melting point of the thermoplastic polymer, it may melt or soften to varying degrees during curing of the resin at elevated temperatures and re-solidify as the cured laminate is cooled. Suitable thermoplastics should not dissolve in the resin, and include thermoplastics, such as polyamides (PAS), polyethersulfone (PES) and polyetherimide (PEI). Polyamides such as nylon 6 (PA6) and nylon 12 (PA12) and mixtures thereof are preferred.

Once prepared and provided with the backing sheet the prepreg may be rolled-up, so that it can be stored for a period of time. It can then be unrolled and the prepreg cut as desired and optionally laid up with other prepregs to form a prepreg stack in a mould or in a vacuum bag which is subsequently placed in a mould and cured.

Once prepared, the prepreg or prepreg stack is cured by exposure to an elevated temperature, and optionally elevated pressure, to produce a cured laminate. As discussed above, the prepregs can provide excellent mechanical properties without requiring the high pressures encountered in an autoclave process.

The curing process may be carried out at a pressure of less than 2.0 bar absolute, preferably less than 1 bar absolute. In a particularly preferred embodiment the pressure is less than atmospheric pressure. The curing process may be carried out at one or more temperatures in the range of from 80 to 200° C., for a time sufficient to cure the thermosetting resin composition to the desired degree.

Curing at a pressure close to atmospheric pressure can be achieved by the so-called vacuum bag technique. This involves placing the prepreg or prepreg stack in an air-tight bag and creating a vacuum on the inside of the bag. This has the effect that the prepreg stack experiences a consolidation pressure of up to atmospheric pressure, depending on the degree of vacuum applied.

Once cured, the prepreg or prepreg stack becomes a composite laminate, suitable for use in a structural application, for example an aerospace structure or a wind turbine blade.

Such composite laminates can comprise structural fibres at a level of from 45% to 75% by volume (fiber volume fraction), preferably from 55% to 70% by volume, more preferably from 58% to 65% by volume (DIN EN 2564 A).

The unique properties of the lightweight layers such as woven and non woven fibrous layers, and other similar structured thermoplastic polymer layers, used in this invention make it possible to cure the laminates using such layers in an out-of-autoclave process. This relatively low pressure and low cost curing process can be used because the damage tolerance (e.g. Compression After Impact—CAI) of the cured laminate is not substantially less than the damage tolerance achieved using the higher pressure and higher expense of an autoclave. In contrast, out-of-autoclave curing of laminates that have interleaf zones toughened with insoluble thermoplastic particles produces cured laminates that have damage tolerances that are significantly reduced.

The invention has applicability in the production of a wide variety of materials. One particular use is in the production of wind turbine blades and spars. Typical wind turbine blades comprise two long shells which come together to form the outer surface of the blade and a supporting spar within the blade and which extends at least partially along the length of the blade. The shells and the spar may be produced by curing the prepregs or stacks of prepregs of the present invention.

The length and shape of the shells vary but the trend is to use longer blades (requiring longer shells) which in turn can require thicker shells and a special sequence of prepregs within the stack to be cured. This imposes special requirements on the materials from which they are prepared. Prepregs based on unidirectional multifilament carbon fibre tows are preferred for blades of length 30 meters or more particularly those of length 40 meters or more such as 45 to 65 meters . The length and shape of the shells may also lead to the use of different prepregs within the stack from which the shells are produced and may also lead to the use of different prepregs along the length of the shell. In view of their size and complexity the preferred process for the manufacture of wind energy components such as shells and spars is to provide the appropriate prepregs within a vacuum bag, which is placed in a mould and heated to the curing temperature. The bag may be evacuated before or after it is placed within the mould. The use of the backing sheet is particularly useful to provide handle ability to such large and complex components.

The reduction in the number of voids in the laminates is particularly useful in providing shells and/or spars and/or spar caps for wind turbine blades having uniform mechanical properties. Particularly spars and parts thereof are subjected to high loads. Any reduction in void content greatly improves the mechanical performance of these parts. This in turn allows the parts to be built at a reduced weight (for example by reducing the number of prepreg layers) in comparison to a similar part which would have a higher void content. Furthermore, in order to withstand the conditions to which wind turbine structures are subjected during use it is desirable that the cured prepregs from which the shells and spars are made have a high Tg and preferably a Tg greater than 90° C.

Having thus described exemplary embodiments of the present invention, it should be rioted by those skilled in the art that the within disclosures are exemplary only and that various other alternatives, adaptations and modifications may be made within the scope of the present invention. Accordingly, the present invention is not limited by the above-described embodiments, but is only limited by the following claims.

What is claimed is:

1. A method where multiple layers of prepreg are formed into prepreg laminar structure that is cured to form a cured laminar structure, said method comprising the steps of:
providing one or more layers of supported prepreg, said one or more layers of supported prepreg each comprising a prepreg and a backing sheet comprising a treated polymer film having an inner side that is in contact with said prepreg, wherein the inner side of said treated polymer film is formed by treating a polymer film with a sufficient amount of corona discharge or flame treatment to increase the surface tension of said polymer film;

forming a prepreg laminar structure comprising said multiple layers of prepreg and one or more layers of said supported prepreg;

heating said prepreg laminar structure for a sufficient time at a sufficient temperature to cure said prepreg laminar structure to form said cured laminar structure; and removing said backing sheet(s) from said cured laminar structure.

2. The method according to claim 1 wherein said cured laminar structure forms part of a wind turbine blade.

3. The method according to claim 1 wherein said prepreg and said supported prepreg comprise unidirectional fibres.

4. The method according to claim 1 wherein said polymer film is low density polyethylene.

5. The method according to claim 4 wherein said low density polyethylene film is from 1 mil to 6 mils thick.

6. The method according to claim 1 wherein said prepreg and said supported prepreg comprise glass fibres, aramid fibres or carbon fibres.

7. The method according to claim 6 wherein the fibres are arranged in fibre tows.

8. The method according to claim 1 wherein the curable resin in said prepreg and said supported prepreg comprise an epoxy resin.

9. The method according to claim 8 wherein said prepreg and said supported prepreg comprise carbon fibres.

10. The method according to claim 9 wherein said polymer film is low density polyethylene.

11. The method according to claim 1 wherein the fibrous reinforcement in said one or more layers of supported prepreg comprises a layer of impregnated unidirectional fibres that is substantially fully impregnated with said curable resin and a layer of unimpregnated unidirectional fibres that is partially impregnated with said curable resin.

12. The method according to claim 1 wherein the fibrous reinforcement in said one or more layers of supported prepreg comprises a layer of impregnated unidirectional fibres that is substantially fully impregnated with a curable resin and a layer of unimpregnated unidirectional fibres that is partially impregnated with a curable resin, wherein said treated polymer film is located in contact with said layer of impregnated unidirectional fibres.

13. The method according to claim 1 wherein the fibrous reinforcement in said multiple layers of prepreg comprises a layer of impregnated unidirectional fibres that is substantially fully impregnated with said curable resin and a layer of unimpregnated unidirectional fibres that is partially impregnated with said curable resin.

* * * * *